Martin & Parry,
Lathe Tool.

N° 6,681.   Patented Aug. 28, 1849.

UNITED STATES PATENT OFFICE.

J. W. MARTIN AND E. PARRY, OF NORTHERN LIBERTIES, PENNSYLVANIA.

CHUCK.

Specification of Letters Patent No. 6,681, dated August 28, 1849.

*To all whom it may concern:*

Be it known that we, JAMES W. MARTIN and E. PARRY, of the district of Northern Liberties, in the county of Philadelphia and State of Pennsylvania, have invented a new and useful Improvement on the machine called "the universal chuck" for the purpose of firmly holding articles to be turned, drilled, or otherwise operated upon, to be used on the face plate of a lathe or attached to any other machinery to which it may be beneficially applied; and I hereby do declare that the following is a full, clear, and exact description of the construction and operation of the same, reference being had to the annexed drawings, making a part of this specification, in which—

Figure 1:
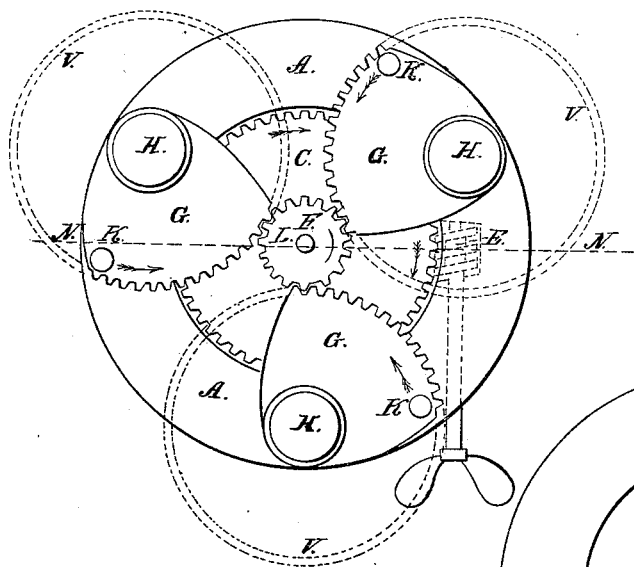
Figure 2:
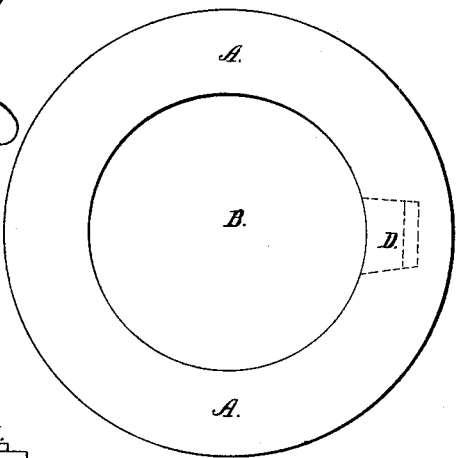
Figure 3:
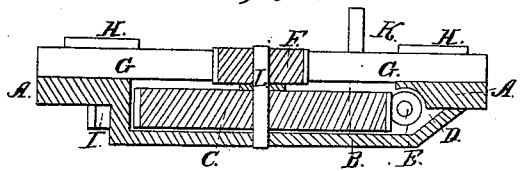

Figure 1 is a face view of the chuck showing the face plate, A A geared sectors G G G, with the jaws or pins K K K and the pivots H H H spur wheel C and the screw E represented with red lines being under the face plate. Fig. 2 is a detached view of the face plate showing the cavity or recess B for the reception of the spur wheel C, and an adjoining cavity or recess D, for the reception of the screw E. Fig. 3, is a sectional view taken at the line N, N, Fig. 1 showing the face plate A A, spur wheel C pinion F, sectors G G with pivots H H, nut I jaw or pin K, and screw E.

In the annexed drawings similar letters of reference are used on similar parts.

To enable others skilled in the art to make and use our invention, we will proceed to describe its construction and operation.

A A, is a face plate having a circular cavity or recess in the center more particularly shown in Fig. 2 for the reception of a spur wheel C, Fig. 1, and also having a smaller adjoining cavity or recess D, Fig. 2, for the reception of a screw E which gears into the spur wheel, attached to the spur wheel and on the same axis. L, is a pinion, F Figs. 1 and 3 which meshes into two or more geared sectors G G G, having their axis or pivots H H H Fig. 1 at equal distances apart and which pivots pass through the face plate A, A, and secure the sectors to it by means of a nut I, Fig. 3 affixed to each sector and in the exact position as shown in Fig. 1 there is a vertical jaw or pin K.

Operation: The article to be operated upon being placed at or near the center of the chuck or axis of pinion L, and power being applied to the screws E turning from left to right it will readily be seen that the spur wheel C pinion F, and sectors G G G will move in the direction as indicated by the arrows Fig. 1, and the jaws or pins K K K being affixed to the sectors as before described. Evidently by a curvilinear motion approach the center till they come in contact with the article placed between them, thus holding it securely until it is turned drilled or otherwise operated upon as desired.

Instead of the sectors there may be attached to the face plate in the same manner two or more toothed wheels represented by the dotted lines V, V, V Fig. 1 by which the jaws, or pins K K K may be removed farther from the center of the chuck thereby securing and holding articles of larger diameter than could be done by the sectors.

The combined action of the screw on the spur wheel, and pinion on the sectors, gives this chuck great ease and power in action, firmness in holding, and being of simple construction may be kept in repair with facility. The face plate, sectors, pinion and spur wheel of chuck may be made of brass or any other desirable metal.

What we claim as our invention, and desire to secure by Letters Patent is—

The arrangement and application of two or more geared sectors G G G, or toothed wheels V, V, V, with the jaws or pins K K K affixed, and meshing into a pinion F, as herein described, in combination with the spur wheel C, and screw E.

JAS. W. MARTIN. [L. S.]
EDWIN PARRY. [L. S.]

Witnesses:
R. MARTIN,
CHAS. C. REED.